United States Patent
Burmester et al.

(10) Patent No.: US 11,193,595 B2
(45) Date of Patent: Dec. 7, 2021

(54) DOUBLE-SEAT VALVE HAVING A DIAPHRAGM

(71) Applicant: GEA Tuchenhagen GmbH, Büchen (DE)

(72) Inventors: Jens Burmester, Grambek (DE); Jörg Pieplow, Lübeck (DE); Stephanie Tegtmeyer, Hamburg (DE)

(73) Assignee: GEA Tuchenhagen GmbH, Büchen (DE)

( * ) Notice: Subject to any disclaimer, the term of this patent is extended or adjusted under 35 U.S.C. 154(b) by 21 days.

(21) Appl. No.: 16/633,861

(22) PCT Filed: Jul. 10, 2018

(86) PCT No.: PCT/EP2018/068641
§ 371 (c)(1),
(2) Date: Jan. 24, 2020

(87) PCT Pub. No.: WO2019/020361
PCT Pub. Date: Jan. 31, 2019

(65) Prior Publication Data
US 2020/0217425 A1    Jul. 9, 2020

(30) Foreign Application Priority Data
Jul. 25, 2017 (DE) .................... 10 2017 007 028.8

(51) Int. Cl.
*F16K 1/44* (2006.01)
*F16K 41/12* (2006.01)
(Continued)

(52) U.S. Cl.
CPC .............. *F16K 1/446* (2013.01); *F16K 25/02* (2013.01); *B67D 2210/0006* (2013.01);
(Continued)

(58) Field of Classification Search
CPC . F16K 1/44; F16K 1/443; F16K 1/446; F16K 1/46; F16K 1/50; F16K 41/10; F16K 41/12
See application file for complete search history.

(56) References Cited

U.S. PATENT DOCUMENTS

| 6,676,047 B1 * | 1/2004 | Jensen | F16K 1/446 |
| | | | 137/240 |
| 2009/0008594 A1 * | 1/2009 | Burmester | F16K 1/446 |
| | | | 251/364 |

(Continued)

FOREIGN PATENT DOCUMENTS

| DE | 42 03 723 A1 | 8/1993 |
| DE | 20 2006 004 174 U1 | 7/2007 |

(Continued)

*Primary Examiner* — Hailey K. Do
(74) *Attorney, Agent, or Firm* — Young Basile Hanlon & MacFarlane, P.C.

(57) ABSTRACT

A double-seat valve includes a housing having a passage between first and second connections. First and second valve disks are arranged in a housing internal space. A leakage space formed in the passage in the valve closed position is sealed off by the second valve disk. A hollow rod connected to the first valve disk has a leakage channel connecting the leakage space and a housing part. A cleaning gap is formed between the second valve disk and a passage wall. A housing opening is sealed with a diaphragm that separates the housing part from the internal space. A section of the first valve disk is received in an opening contour in the passage in the valve closed position, and delimits a cut-out in the first valve disk, in which the second valve disk is received in the valve open position.

20 Claims, 5 Drawing Sheets

(51) Int. Cl.
   *F16K 25/02* (2006.01)
   *F16K 1/46* (2006.01)
   *F16K 37/00* (2006.01)

(52) U.S. Cl.
   CPC ............ *F16K 1/46* (2013.01); *F16K 37/0008* (2013.01); *F16K 41/12* (2013.01)

(56) References Cited

U.S. PATENT DOCUMENTS

2010/0132822 A1  6/2010  Burmester et al.
2015/0129790 A1  5/2015  Sudel et al.

FOREIGN PATENT DOCUMENTS

| DE | 10 2007 027 765 A1 | 12/2008 |
| DE | 10 2011 103 371 A1 | 12/2012 |
| EP | 2 734 757 B1 | 12/2014 |
| WO | 93/016307 A1 | 8/1993 |
| WO | 2004/063609 A1 | 7/2004 |
| WO | 2013/170931 A1 | 11/2013 |

\* cited by examiner

DOUBLE-SEAT VALVE HAVING A DIAPHRAGM

TECHNICAL FIELD

The invention relates to a double-seat valve having a diaphragm.

BACKGROUND

Double-seat valves are an important component for fluid control in the process industry. In this case, the process industry in particular means beverage technology, food technology, pharmaceuticals, and biochemistry. The processes involved in the aforementioned sectors set high standards for hygiene inside the process components and thus inside the valves.

Double-seat valves comprise a double-sealed passage between a first connection and a second connection. They are therefore sought for many hygienic processes. Two seals cooperate with two valve seats, between which seals a leakage space is formed. In the event of failure of a seal, for example, fluid is collected in said leakage space without said fluid passing directly through the passage and the media coming into contact with the surroundings. The double sealing makes it possible to partially open one of the seals in order to clean the seal and associated valve seat while the other seal is still in use. The excellent cleanability and reliable media separation result in excellent hygienic conditions inside the double-seat valve.

In one design, double-seat valves are used as valves on a container outlet and, in this regard, are referred to as tank-bottom valves.

In the case of tank-bottom valves, it is difficult to empty the leakage space without the pressure increasing therein. On account of the required design, emptying is carried out through one of the valve rods by means of which the valve disks are moved, which valve rod is designed as a hollow rod. Emptying while preventing backflow of the cleaning agent used into the valve internal space is only possible if the hollow rod moving one of the closing members has large flow cross sections. This is associated with a large outer diameter of the hollow rod.

Examples of double-seat valves adapted for these applications are given in WO 93/16307 A1 and WO 2004/063609 A1.

WO 93/16307 A1 relates to defining the size of the channel through which the leak flows from the leakage space. This document proposes a hollow rod by means of which the leakage space is enlarged to form a reservoir with or without controllable ventilation. This is intended to improve the cleanability.

WO 2004/063609 A1 proposes a tank-bottom valve which is easy to clean and in which the hollow rod comprises a constriction below one seal and above a housing duct. Therefore, the closing part driven in a dependent manner is designed to be largely pressure-compensated.

The hygienic conditions in the valves can be improved by means of a diaphragm which seals off the movement of the valve rod/hollow rod through the housing from the inside of the valve to the outside. A central bore in the diaphragm is secured to the hollow rod and an outer edge of the diaphragm is held by means of the housing.

A diaphragm seal in a single-seat valve is presented in WO 2013/170931 A1. In this patent document, the means for holding the diaphragm at the outer edge thereof is improved. Going beyond single-seat valves, double-seat valves have already been equipped with diaphragm seals between the coupling element and the housing. The prevailing direction of thought over the last ten years in the design of a double-seat valve having a diaphragm seal is exemplified in the documents DE 20 2006 004 174 U1 and EP 2 734 757 B1.

BRIEF SUMMARY

An object of the disclosure is to provide a double-seat valve having a diaphragm that can be used as a tank-bottom valve.

A double-seat valve described herein is equipped with a housing. The housing includes a first connection, a second connection, and a passage comprising a passage wall arranged between the first and second connection. The valve comprises a first valve disk and a second valve disk, which are arranged in a valve internal space of the housing. The valve has a hollow rod, which is connected to the first valve disk, as well as a valve rod, which is connected to the second valve disk and is arranged so as to pass through the hollow rod. A first valve seat and a second valve seat are included, as is a drive configured to actuate at least one valve disk. A housing opening faces the drive. A leakage space that is sealed off by the second valve disk is formed in the passage in a closed position of the double-seat valve. The hollow rod comprises a leakage channel that creates a fluid connection between the leakage space and a housing part that is separated from the valve internal space by means of the diaphragm. A cleaning gap having a cross section can be formed between the second valve disk and the passage wall. The leakage channel has a channel cross section that is greater than the cross section of the cleaning gap.

Said double-seat valve is suitable for use as a tank-bottom valve because drainage out of the leakage space occurs through a hollow rod that penetrates the diaphragm. The cross section condition prevents excessive pressure build-up in the leakage space and leakage channel.

However, the diaphragm is a decisive element for the lift that can be achieved and for the fluid flow through the open valve.

In the passage an opening contour is formed, in which a section of the first valve disk is at least partly received in the closed position of the double-seat valve. The section delimits a cut-out in the first valve disk, in which the second valve disk is received in an open position of the double-seat valve.

When the valve disks move one into the other, they cooperate with the opening contour because a large through-flow cross section is achieved with a small amount of lift of the valve disks.

An additional advantage of the cooperation between the valve disk configuration and the diaphragm is that fluids containing solid pieces can also flow through the double-seat valve, a smaller amount of space being required for the passage, valve disks, and drive on account of the small amount of lift and the short distance required between the valve disks compared with the prior art. In addition, the diaphragm itself is subjected to little mechanical stress on account of the small amount of lift.

The danger of excessive pressure build-up in the cleaning fluid during drainage is further reduced in one development. According to said development, a first choke gap having a first gap cross section can be formed between the first valve disk and the passage wall and the cleaning gap is designed as a second choke gap having a second gap cross section. The leakage channel has a channel cross section that is greater than the larger of the first and second gap cross sections. The through-flow cross section of a choke gap is smaller than in a cleaning gap, and therefore the first and/or second gap cross section is significantly smaller than the channel cross section, for example one third or one quarter as large. A choke gap also increases the cleaning effect in the region of the valve seat and seal.

In one development, a first choke gap having a first gap cross section can be formed between the first valve disk and the passage wall and the cleaning gap is designed as a second choke gap having a second gap cross section. The leakage channel has a channel cross section that is greater than the larger of the first and second gap cross sections. This effectively prevents excessive pressure build-up, which pushes on the relevant valve disk that actually remains closed, and also improves the cleaning effect in the region of the seat.

In another development, the hollow rod is mounted in a plain bearing bush and positive engagement is produced between an outer contour of the hollow rod and an inner contour of the plain bearing bush, thus preventing rotation about a lift axis. This reduces torsional loading of the diaphragm. In addition to increasing the service life, this arrangement also improves hygiene by reducing the forces acting on the fixing means because slippage of the diaphragm at the fixing point is reduced.

According to another development, an inner edge of the diaphragm is held between the hollow rod and a holding element screwed to the hollow rod and the holding element is secured by means of a lock nut. This produces secure fixing of the diaphragm, which is hygienic and cost-effective.

In another development, the first valve seat is formed in the opening contour. This creates a space-saving design and an improved through-flow to lift ratio. As a result, the flow rate of fluid through the valve can be increased at a given lift.

The switching leakage of the double-seat valve is reduced and hygiene is improved in that, according to one development, a first seal cooperates with the first valve disk and the first valve seat is designed to be axially sealing.

The danger of excessive pressure build-up, which unfavorably influences the switching state of the double-seat valve, can be reliably reduced in that, in one development, the channel cross section is at least three times the size of the larger of the first and second gap cross sections.

The central opening of the annular diaphragm can be designed to be smaller, and thus a greater amount of lift can be achieved with a fixed outer diameter of the diaphragm by not guiding the valve rod in the region of the central opening. This is advantageously achieved in one development by means of a guiding means that centers the second valve disk relative to the first valve disk and that is arranged between the second valve disk and the diaphragm in the axial direction.

In another development, the guiding means is fastened to the valve rod and is arranged in a supportive manner in the leakage channel. This makes the device inexpensive to manufacture, easy to assemble, and easy to clean.

The latter two developments can also be improved in that the guiding means comprises a leakage passage having a through-flow area that corresponds at least to the smallest channel cross section of the leakage channel.

This produces good drainage of leaks and therefore reliably prevents the above-mentioned excessive pressure build-up.

The invention will be explained in greater detail and the effects and advantages expounded in greater depth in the following based on an exemplary embodiment and the developments thereof.

DETAILED DESCRIPTION

Figure 1:
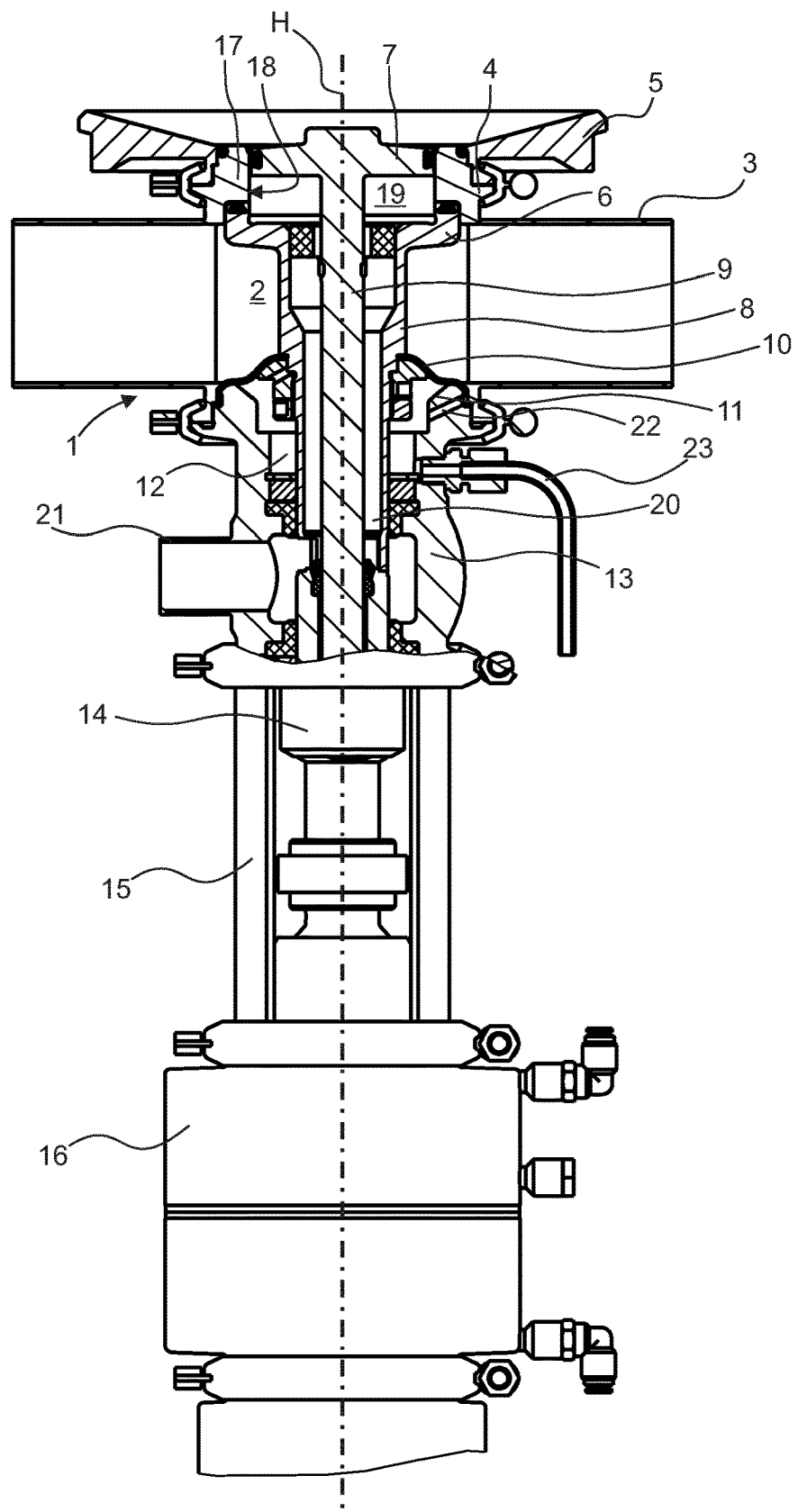
FIG. 1 is a section along the lift axis through a diaphragm-sealed double-seat valve in the closed state.

In FIG. 1, a double-seat valve designed as a tank-bottom valve is shown in partial cross section in the closed switching state thereof, i.e., in a closed position. A housing 1 having a valve internal space 2 comprises a first connection 3 and a second connection 4. The first connection 3 may be designed such that it can be connected to a pipeline and, in the example shown, the second connection 4 comprises a tank adapter 5 that can be connected to a container. In the closed position, the flow of fluid between the first connection 3 and second connection 4 is prevented.

A first valve disk 6 and a second valve disk 7 are movably arranged in the valve internal space 2 in order to influence the flow of fluid inside the double-seat valve and through the double-seat valve.

A hollow rod 8 is connected to the first valve disk 6, whereas a valve rod 9 is connected to the second valve disk 7 and is arranged such that it passes through the hollow rod 8. The hollow rod 8 and the valve rod 9 that can move therein together penetrate a diaphragm 10 that seals the housing opening 11. A cavity 12 of a housing part 13 is separated from the valve internal space 2 by the action of the diaphragm 10. The so-called shuttle effect, in which contaminants adhere to a rod and pass a seal during the switching movement, is prevented by means of the diaphragm 10. The hollow rod 8 and valve rod 9 pass through the cavity 12 and housing part 13. Each of said rods may be composed of a plurality of interconnected rod sections. However, it is hygienically advantageous to dispense with partitions within the valve internal space 2.

The hollow rod 8 is mounted in a plain bearing bush 14. A seal for separating the regions from one another may be provided on the side of the plain bearing bush 14 facing the interior of the housing part 13 in the fluid direction. A lantern 15 that bears a drive 16 can be fastened to the housing part 13. The drive 16 is configured to produce a longitudinal movement of the hollow rod 8 and valve rod 9. The function of the drive 16 at least includes the possibility of producing the closed position and an open position of the double-seat valve by moving the first valve disk 6 and second valve disk 7. Preferably, the drive 16 is designed to bring at least one of the first valve disk 6 or the second valve disk 7 into a seat-cleaning position. The drive 16 may be designed to be operated by pressure media, for example pneumatically.

A passage 17 comprising a passage wall 18 is formed in the housing 1 between the first connection 3 and the second connection 4. When the tank-bottom valve is open, the fluid flows through said passage 17. However, in the closed position, the passage wall 18 and the first valve disk 6 and the second valve disk 7 delimit a leakage space 19 such that the same is formed in the passage 17 and is sealed off by the second valve disk 7. A leakage channel 20, through which fluid in the form of a leak flows out during switching of the double-seat valve, during cleaning, or in the event of seal failure, is formed in the hollow rod 8 between the hollow rod 8 and the valve rod 9. Said fluid exits once it has flowed out of the leakage space 19 through the leakage channel 20 and once it has flowed through the diaphragm 10 inside the hollow rod 8, through the housing part 13, and through an outlet nozzle 21.

If the diaphragm 10 springs a leak, the leak will enter the cavity 12. The fixing means, which holds an outer edge of the diaphragm 10, may comprise a leakage passage 22 that leads leaked fluid out of the fixing region and into the cavity 12. An outlet pipe 23 is fluidically connected to the cavity 12 such that it is reliably shown when the diaphragm 10 has sprung a leak and should be replaced.

Figure 2:
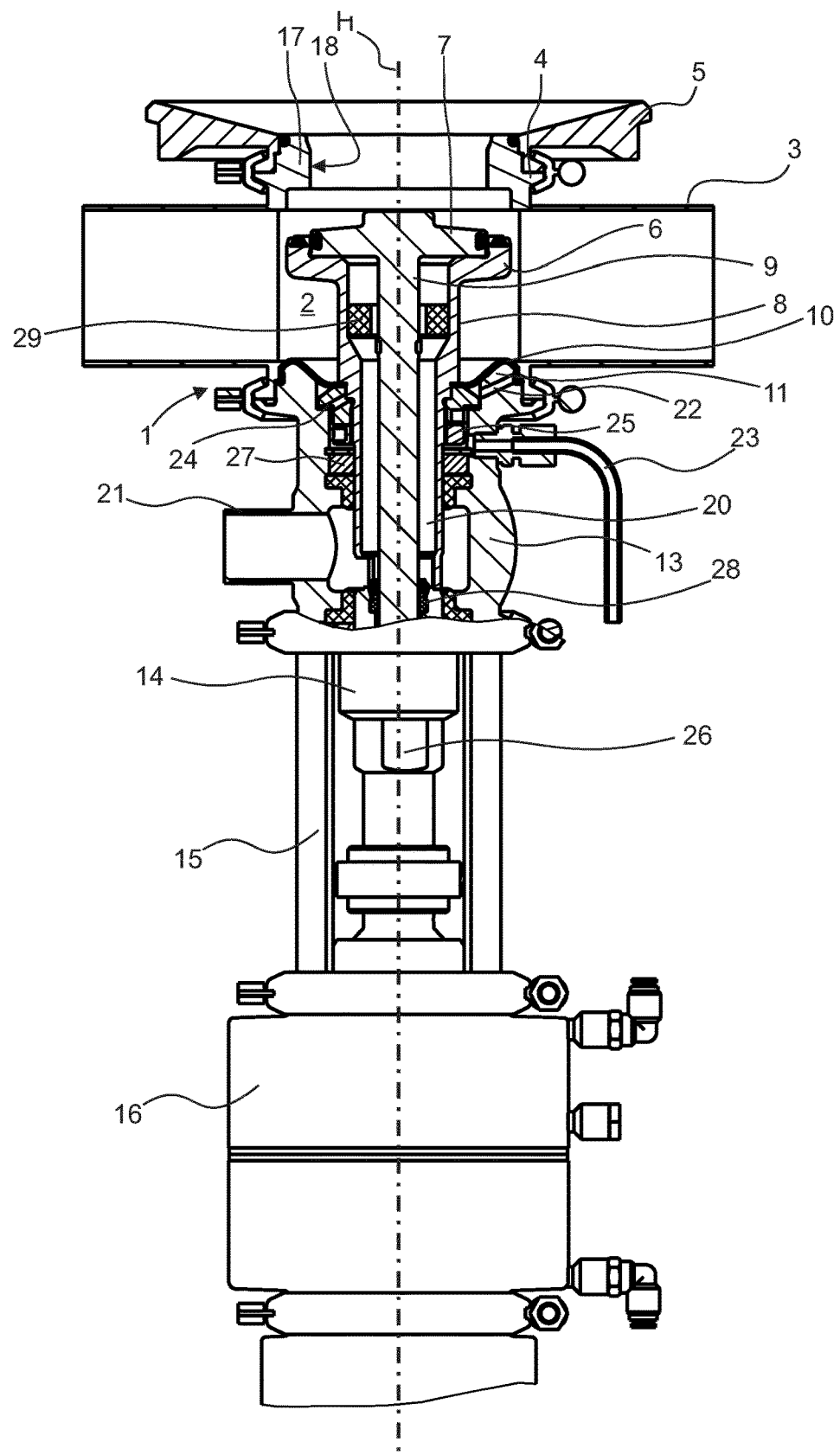
FIG. 2 is a section along the lift axis through a diaphragm-sealed double-seat valve in the open state.

FIG. 2 shows the double-seat valve in partial cross section in the open position, in which a free fluid connection is established between the first connection 3 and the second connection 4. The free fluid connection is produced in that the first valve disk 6 and second valve disk 7 are retracted into the valve internal space 2 and open the passage 17.

The diaphragm 10 comprises an inner edge that delimits a central opening and is secured to the hollow rod 8. This securing action is produced by means of a holding element 24. Said holding element 24 is screwed to the hollow rod 8 and secured by means of a lock nut 25. The holding element 24 pushes the inner edge against a shoulder of the hollow rod 8. In this way, secure fixing of the diaphragm 10 is ensured in a simple, low-wear, and hygienic manner. This non-positive securing action can be complemented by positive engagement in order to improve wear resistance and hygiene. The diaphragm 10 is shaped and the axial location at which it is held on the inner and outer edge is selected such that the diaphragm 10 has the shape of a dome free of creases and folds in the closed state of the double-seat valve, as shown in FIG. 1. As a result, drainage of liquid off the diaphragm 10 is ensured, and the selected design prevents the formation of puddles containing residue.

Reliable functioning of the double-seat valve, in particular reliable closing, and long useful lives of the components are advantageous properties of the double-seat valve shown. In order to achieve these goals, the hollow rod 8 and the valve rod 9 are securely guided in their movement, which produces precise alignment between said components. This has a beneficial effect both on function and useful life.

The hollow rod 8 is mounted in the plain bearing bush 14, which is the mounting point closest to the drive 16. The plain bearing bush 14 may have an inner contour that positively engages with an outer contour of the hollow rod 8, which prevents a rotation about a lift axis. This may for example be achieved in that the inner contour and outer contour have a rotationally asymmetric shape. Such a means is the flat bearing surface 26 as part of the outer contour, which cooperates with an assigned flat surface on the inner contour. By preventing rotation of the hollow rod 8 by means of the positive engagement, the mechanical stress on the diaphragm 10 is reduced. The torsion that produces mechanical stress by twisting the inner and outer fixing points of the diaphragm 10 relative to one another is largely prevented.

A plain bearing 27 is arranged on the side of the plain bearing bush 14 facing away from the drive 16 and beyond the outlet nozzle 21. The plain bearing 27 provides a second mounting point for the hollow rod 8. A seal can be provided on the side of the plain bearing 27 facing the outlet nozzle 21 in order to separate these regions from one another and to keep the plain bearing 27 clean.

The valve rod 9 is mounted at a first point by means of a valve rod bearing 28, which is arranged on the side of the outlet nozzle 21 facing the drive 16.

Guiding means 29 is located at a height between the second valve disk 7 and the diaphragm 10 in the axial direction, i.e., along the lift axis. Said guiding means 29 guides and mounts the valve rod 9 such that the valve rod 9 and second valve disk 7 are oriented in spatial relation to the hollow rod 8 and the first valve disk 6. This additionally centers the second valve disk 7 relative to the first valve disk 6. The resulting large axial distance between the valve rod bearing 28 and the guiding means 29 and the shifting of the required space away from the diaphragm 10 are advantageous and mean that the central opening of the diaphragm has a small diameter. Said diameter is merely determined by the size of the leakage channel 20 and the wall thickness of the hollow rod 8. Dispensing with guiding and mounting at this point reduces the diameter. Therefore, a small diaphragm 10 or a larger amount of lift is possible because the lift depends on the outer diameter of the diaphragm 10 and the diameter of the central opening. The guiding means 29 is designed such that leaks can flow therethrough.

Figure 3:
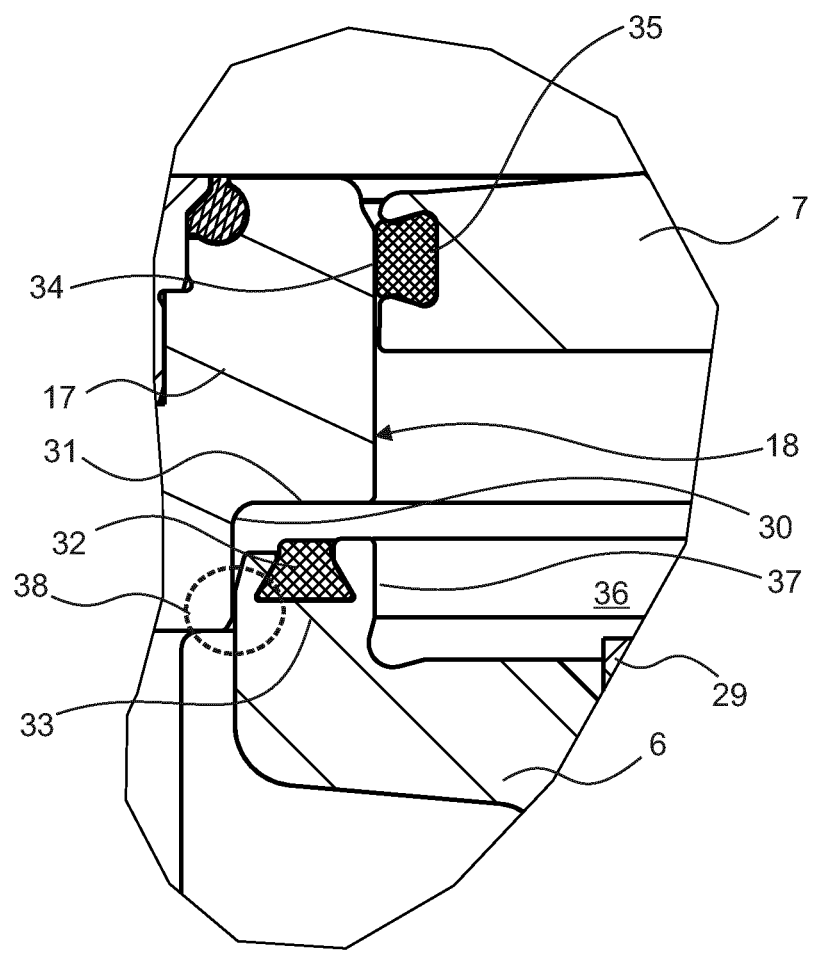
FIG. 3 is a cross-sectional view of a detail of the passage in the cleaning position of the first valve disk.
Figure 4:
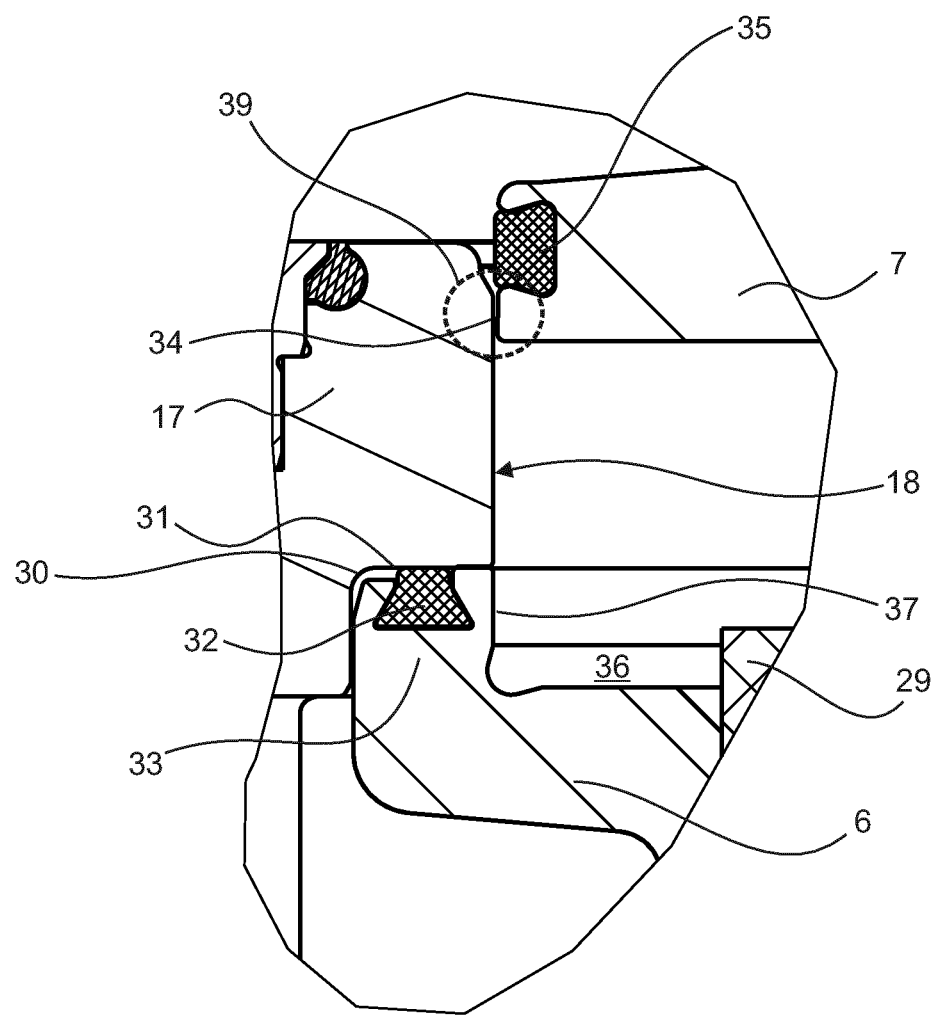
FIG. 4 is a cross-sectional view of a detail of the passage in the cleaning position of the second valve disk.

A detail of the passage 17 is shown in an enlarged view in FIG. 3 and FIG. 4. FIG. 3 shows the first valve disk 6 in a partial lift position, whereas the second valve disk 7 is in the closed position. Conversely, in FIG. 4, the first valve disk 6 is in the closed position and the second valve disk 7 is in a partial lift position. The partial lift positions are used for cleaning the double-seat valve, in particular for cleaning the valve seats.

An opening contour 30, which comprises a first valve seat 31 that cooperates in a sealing manner with a first seal 32 in the closed position of the double-seat valve, is formed in the passage 17. The first seal 32 may be axial, radial, or semi-axial. Advantageously, however, the first seal 32 is designed as an axial seal and is arranged on a section 33 of the first valve disk 6. The opening contour 30 is shaped such that the first section 33 is at least partly received therein in the closed position of the double-seat valve. The section 33 of the first valve disk 6 plunges into the passage 17 in the closed position. The axial design of the first seal 32 facilitates this design. When the section 33 is received in the opening contour 30 or plunges therein, a large through-flow area between the passage 17 and the first valve disk 6 is advantageously created in the open position of the double-seat valve at a given lift of the first valve disk 6. The lift strongly depends on the outer diameter and inner diameter of the diaphragm 10. The embodiment of the opening contour 30 shown therefore makes it possible to produce a double-seat valve having a high liquid flow rate with a small diaphragm 10, or to reduce the size of the diaphragm 10 at a given liquid flow rate.

A second valve seat 34 that cooperates in a sealing manner with a second seal 35 in the closed position of the double-seat valve is formed in the passage wall 18. The second seal 35 is designed to seal radially and is received in a groove in the second valve disk 7. The radial design of the second seal 35 has a strongly reductive effect on so-called switching leakage during a change of the switching state of the double-seat valve. Switching leakage refers to fluid that undesirably enters the leakage space 19 during switching, where it can form residue. The embodiment shown here is virtually devoid of such switching leakage, as a result of which little residue is formed. This simplifies cleaning and improves the hygienic conditions in the valve.

A cut-out 36 that is delimited and surrounded by the section 33 in the radial direction is formed on the side of the first valve disk 6 facing the second valve disk 7. The inner wall of the section 33, which faces the cut-out 36, is at least partly formed as a third valve seat 37. The dimensions are selected such that the second valve disk 7 can be fully or at least partly received in the cut-out 36. The dimensions are further selected such that the second seal 35 cooperates with the third valve seat 37 in a sealing manner when the second valve disk 7 is received in the cut-out 36, such that, in an advantageously cost-effective manner, the second seal 35 is sufficient for sealing the valve disks 6 and 7 off from one another in the open position and for sealing the second valve disk 7 and the second valve seat 34 off from one another in the closed position. This position is shown in FIG. 2 and is advantageously implemented in the open position of the double-seat valve.

The embodiment shown of the cut-out 36 for receiving the second valve disk 7 amplifies the effect of producing a double-seat valve having a high liquid flow rate with a small diaphragm 10, or of reducing the size of the diaphragm 10 at a given liquid flow rate. The above-described arrangement of the guiding means 29 reliably centers the second valve disk 7 relative to the first valve disk 6, and therefore the movement of the second valve disk 7 into the cut-out 36 takes place in a reliable manner without collisions or jamming. This advantageously allows for narrow gap dimensions between the cut-out 36 and the second valve disk 7.

FIG. 3 shows the first valve disk 6 in a partially open position. In this position, the first seal 32 has been lifted off the first valve seat 31 and therefore both components no longer cooperate in a sealing manner. At the same time, the second valve disk 7 is in a position in which the second seal 35 cooperates with the second valve seat 34 in a sealing manner. In this position, the first valve seat 31 and the first seal 32 can be cleaned by the action of a cleaning agent, in particular by means of said cleaning agent flowing thereon. Said cleaning agent is led away through the leakage channel 20. In order not to overload the leakage channel 20 and in order for the cleaning agent not to accumulate before the leakage channel 20 in the direction of flow and for no pressure to build up between the leakage channel and the region of the first valve seat 31, a first choke gap 38 having a first gap cross section can advantageously be formed between the passage wall 18. The first valve disk 6 and is advantageously formed in the partially open, first cleaning position shown.

A second cleaning position is shown in FIG. 4. In this position, the first valve seat 31 and the first seal 32 are in sealing contact with one another. The second seal 35 is separated from the second valve seat 34 and is opened slightly by means of a partial lift of the second valve disk 7 such that a cleaning gap 39 is formed between the second valve disk 7 and the passage wall 18. In this case, too, the cleaning gap 39 is dimensioned such that accumulation of and excessive pressure build-up in the cleaning agent is prevented between the cleaning gap 39 and the leakage channel 20.

Advantageously, the cleaning gap 39 is designed as a second choke gap having a second gap cross-section. The embodiment of the gap as a choke gap differs from that of a cleaning gap in terms of the flow area that is suitable for the through-flow of fluid and that corresponds to the cross-sectional flow area of the gap. In the case of a cleaning gap, said cross-sectional flow area is smaller than a channel cross-sectional flow area of the leakage channel 20. In the case of a choke gap, however, the cross-sectional flow area is significantly smaller than the channel cross-sectional flow area. The cross-sectional flow area of a choke gap is one third of the channel cross-sectional flow area, and is often one quarter or less. The choke gap has a greater influence on the flow speed of the cleaning agent, with the aim of generating a kinetic cleaning effect on the associated valve seat. In relation to the first choke gap 38 and the cleaning gap 39. "can be formed" means that the gap exists at least in one lift position of the first valve disk 6 and/or second valve disk 7, but generally not in all lift positions of the valve disks 6 and 7.

The accumulation of cleaning agent is reliably prevented in that the channel cross-section of the leakage channel 20, preferably, the smallest channel cross-sectional flow area over the extent of the leakage channel 20, is selected to be greater than the larger of the first and second gap cross-sectional flow areas.

Figure 5:
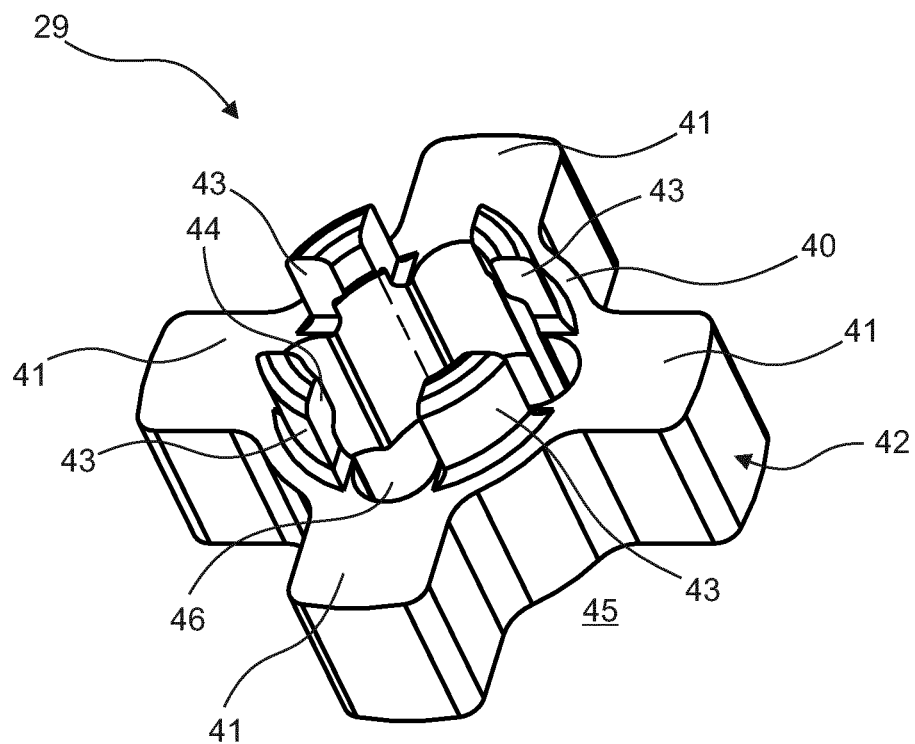
FIG. 5 is a perspective view of a guiding means.

The guiding means 29 is shown in a perspective view in FIG. 5.

The guiding means 29 comprises a ring 40, through the central opening of which the valve rod 9 passes when the guiding means 29 is installed. At least one tooth 41 extending in the radial direction is provided on the circumference of the ring 40. A support surface 42 is provided on the radially outer side of the tooth 41 facing away from the ring 40. The support surface 42 is in sliding contact with the wall of the leakage channel 20, as a result of which the guiding means 29 and thus, indirectly, the valve rod 9 are supported in the hollow rod 8 in a sliding manner.

At least one tab 43 is attached to the ring 40 in the axial direction. The tab 43 is elastically deformable and comprises a protuberance 44 that engages with a cut-out in the valve rod 9, for example a groove. In this way, the guiding means 29 can advantageously be fastened to the valve rod 9 in a simple and cost-effective manner.

Because the guiding means 29 is installed in the leakage channel 20 inside the hollow rod 8 and cleaning agent is intended to flow through said leakage channel 20, the guiding, means 29 comprises a leakage passage 45. The leakage passage 45 spans the intermediate space between the ring 40 and the tooth 41. In addition, a notch 46 or a plurality of notches 46 distributed over the inner circumference of the ring 40 may be provided. The sum of the individual opening areas of the notches 46 and the tooth intermediate spaces equals the through-flow area of the leakage passage 45. Said through-flow area is dimensioned such that it corresponds at least to the smallest channel cross-sectional flow area of the leakage channel 20. This prevents accumulation of the cleaning agent draining, away and prevents pressure build-up inside the leakage channel 20. The leakage passage may consist of bores, cut-outs, undercuts, and the like. Alternatively or additionally, the manufacture of the guiding means 29 may include a casting procedure.

The reference numbers used in the drawing figures are listed below.

1 Housing
2 Valve internal space
3 First connection
4 Second connection
5 Tank adapter
6 First valve disk
7 Second valve disk
8 Hollow rod
9 Valve rod
10 Diaphragm
11 Housing opening
12 Cavity 13 Housing part
14 Plain bearing bush
15 Lantern
16 Drive
17 Passage
18 Passage wall
19 Leakage space
20 Leakage channel
21 Outlet nozzle
22 Leakage passage
23 Outlet pipe
24 Holding element
25 Lock nut
26 Bearing surface
27 Plain bearing
28 Valve rod bearing
29 Guiding means
30 Opening contour
31 First valve seat
32 First seal
33 Section
34 Second valve seat
35 Second seal
36 Cut-out
37 Third valve seat
38 First choke gap
39 Cleaning gap
40 Ring
41 Tooth
42 Support surface
43 Tab
44 Protuberance
45 Leakage passage
46 Notch
H Lift axis

The invention claimed is:
1. A double-seat valve, comprising:
 a housing, comprising:
  a first connection;
  a second connection; and
  a passage that is arranged between the first connection and the second connection, the passage having a passage wall;
 a first valve disk and a second valve disk arranged in a valve internal space of the housing;
 a hollow rod connected to the first valve disk, the hollow rod comprising a valve rod connected to the second valve disk and arranged to pass through the hollow rod;
 a first valve seat;
 a second valve seat;
 a drive configured to actuate at least one of the first valve disk or the second valve disk; and
 a housing opening facing the drive, the housing comprising a leakage space formed in the passage in a closed position of the double-seat valve and sealed off by the second valve disk, wherein:
 the hollow rod has a leakage channel that creates a fluid connection between the leakage space and a housing part,
 the second valve disk and the passage wall form a cleaning gap having a cross-sectional flow area therebetween,
 the leakage channel has a channel cross-sectional flow area that is greater than a cross-sectional cleaning gap flow area,
 the housing opening is sealed with a diaphragm that separates the housing part from the valve internal space,
 in the passage an opening contour is formed, in which a section of the first valve disk is at least partly received in the closed position of the double-seat valve, and
 the section delimits a cut-out in the first valve disk in which the second valve disk is at least partly received in an open position of the double-seat valve.

2. The double-seat valve according to claim 1, wherein an inner edge of the diaphragm is held between the hollow rod and a holding element screwed to the hollow rod, the double-seat valve further comprising a lock nut that secures the holding element.

3. The double-seat valve according to claim 1, wherein the first valve seat is formed in the opening contour.

4. The double-seat valve according to claim 1, further comprising:
 a seal that cooperates with the first valve disk and the first valve seat and is designed to be axially sealing.

5. The double-seat valve according to claim 1, further comprising:
 a first choke gap having a first gap cross-sectional flow area formed between the first valve disk and the passage wall, wherein the cleaning gap is designed as a second choke gap having a second gap cross-sectional flow area, and the channel cross-sectional flow area is greater than a larger of the first gap cross-sectional flow area or the second gap cross-sectional flow area.

6. The double-seat valve according to claim 5, wherein the channel cross-sectional flow area is at least three times a size of the larger of the first gap cross-sectional flow area or the second gap cross-sectional flow area.

7. The double-seat valve according to claim 5, wherein the hollow rod is mounted in a plain bearing bush and produces positive engagement between an outer contour of the hollow rod and an inner contour of the plain bearing bush, thus preventing rotation about a lift axis.

8. The double-seat valve according to claim 5, wherein an inner edge of the diaphragm is held between the hollow rod and a holding element screwed to the hollow rod, the double-seat valve further comprising a lock nut that secures the holding element.

9. The double-seat valve according to claim 5, wherein the first valve seat is formed in the opening contour.

10. The double-seat valve according to claim 5, further comprising:
 a seal that cooperates with the first valve disk and the first valve seat and is designed to be axially sealing.

11. The double-seat valve according to claim 5, further comprising:
 guiding means that centers the second valve disk relative to the first valve disk and is arranged between the second valve disk and the diaphragm in an axial direction.

12. The double-seat valve according to claim 1 wherein the hollow rod is mounted in a plain bearing bush and produces positive engagement between an outer contour of the hollow rod and an inner contour of the plain bearing bush, thus preventing rotation about a lift axis.

13. The double-seat valve according to claim 12, wherein an inner edge of the diaphragm is held between the hollow rod and a holding element screwed to the hollow rod, the double-seat valve further comprising a lock nut that secures the holding element.

14. The double-seat valve according to claim 12, wherein the first valve seat is formed in the opening contour.

15. The double-seat valve according to claim 12, further comprising:
  a seal that cooperates with the first valve disk and the first valve seat and is designed to be axially sealing.

16. The double-seat valve according to claim 12, further comprising:
  guiding means that centers the second valve disk relative to the first valve disk and is arranged between the second valve disk and the diaphragm in an axial direction.

17. The double-seat valve according to claim 1, further comprising:
  guiding means that centers the second valve disk relative to the first valve disk and is arranged between the second valve disk and the diaphragm in an axial direction.

18. The double-seat valve according to claim 17, wherein the guiding means comprises a leakage passage having a through-flow area that corresponds at least to a smallest cross-sectional flow area of the channel cross-sectional flow area.

19. The double-seat valve according to claim 17, wherein the guiding means is fastened to the valve rod and is arranged in a supportive manner in the leakage channel.

20. The double-seat valve according to claim 19, wherein the guiding means comprises a leakage passage having a through-flow area that corresponds at least to a smallest cross-sectional flow area of the channel cross-sectional flow area.

\* \* \* \* \*